United States Patent [19]

Powell

[11] Patent Number: 5,177,899
[45] Date of Patent: Jan. 12, 1993

[54] MODULAR PLANTER TROUGH WITH STABILIZED MOUNTING BRACKET

[76] Inventor: A. J. Powell, 2884 Beaver Grade Rd., Coraopolis, Pa. 15108

[21] Appl. No.: 632,982

[22] Filed: Dec. 20, 1990

[51] Int. Cl.⁵ .............................................. A01G 9/02
[52] U.S. Cl. ........................................ 47/66; 248/228; 248/214
[58] Field of Search ...................... 47/66; 248/228, 214

[56] References Cited

U.S. PATENT DOCUMENTS

| | | | |
|---|---|---|---|
| 296,088 | 6/1988 | Pouliot | D11/155 |
| 296,089 | 6/1988 | Pouliot | D11/156 |
| 312,983 | 12/1990 | Powell | D11/156 |
| 2,789,391 | 4/1957 | Perry | 248/214 |
| 3,414,910 | 12/1968 | Provi | 248/228 |
| 3,866,381 | 2/1975 | Eschbach | 52/731 |
| 4,559,738 | 12/1985 | Helfman | 47/66 |
| 4,640,045 | 2/1987 | Nesbitt et al. | 47/66 |
| 4,698,936 | 10/1987 | Helfman | 47/68 |
| 4,912,876 | 4/1990 | Ginsberg | 47/66 |

FOREIGN PATENT DOCUMENTS 2186775 8/1987 United Kingdom .................. 47/66

Primary Examiner—Henry E. Raduazo
Attorney, Agent, or Firm—Webb, Burden, Ziesenheim and Webb

[57] ABSTRACT

Disclosed is a planter with an improved mechanism for stably affixing it to a wall partition. The planter includes a continuous peripheral perimeter wall and a bottom wall. The bottom wall carries a mounting channel with a pair of opposed flanges extending downwardly from the bottom wall. The flanges include at least one pair of locking mounts which permit the planter to be forcibly inserted over a peripheral trim strip of the wall partition to quickly, easily and stably affix the planter to the top of the wall partition.

20 Claims, 3 Drawing Sheets

FIG_5

MODULAR PLANTER TROUGH WITH STABILIZED MOUNTING BRACKET

BACKGROUND OF THE INVENTION

1. Field of the Invention

The present invention relates to planters and, more particularly, to planters suitable for mounting on wall partitions, such as those utilized in open plan offices.

2. Description of the Prior Art

To effectively and efficiently utilize office space while maintaining the maximum flexibility to meet ever-changing needs, modern offices have come to rely heavily on wall partitions. Such wall partitions are often referred to as "open plan" wall partitions, "partial height" wall partitions or simply "wall partitions". Wall partitions permit a modern office to partition open floor space into several offices of any size. Open plan wall partitions typically include an internal metal frame covered with a desired surface finish. The peripheral surfaces of the wall partitions also generally include an external metal or plastic trim strip which protects the edges and provides a finished, decorative appearance.

Office space is often at a premium where wall partitions are utilized, and the offices formed by the wall partitions tend to be relatively small. Office personnel wishing to improve their office space with plants must either sacrifice valuable office space for the plants or forgo having any plants at all.

Several attempts have been made in the art to develop planters that are compatible with open plan wall partitions and which are as unobtrusive as possible into the office space. Some known planters include grooves or support arms to mount the planter to the top of a wall partition. For example, the applicant of the present application has a design patent U.S. Pat. No. Des. 312,983, issued Dec. 18, 1990 on such a planter. Other examples include U.S. Pat. No. 4,559,738 and U.S. Des. Pat. Nos. D296,088 and D296,089. However, this type of planter can be unstable when mounted on wall partitions having wider peripheral trim strips. In addition, a planter utilizing this type of mount can be accidentally knocked off of a wall partition and may cause damage or injury to office personnel or equipment. Other planters are more stably mounted on the wall partition through the use of complex and expensive brackets. See U.S. Pat. Nos. 4,698,936 and 4,640,045.

It is an object of the present invention to provide a planter which is suitable for use with open plan wall partitions, including wall partitions having peripheral trim strips. It is another object to provide such a planter which exhibits improved stability, is uncomplicated in design, is easy to manufacture and use, and is not unwieldy to either install or remove.

SUMMARY OF THE INVENTION

I have invented a planter which generally includes an improved mechanism for stably affixing the planter to an open plan wall partition. The planter includes an open topped planter trough having a peripheral perimeter wall and a bottom wall attached thereto, and a pair of opposed flanges extending downwardly from the bottom wall. The flanges are spaced apart from each other to form a mounting channel in between. Each flange also includes a raised locking mount. A first raised locking mount is disposed on a lower, inner end of a first of the flanges and a second raised locking mount is opposed to the first locking mount and is positioned on the lower, inner end of a second of the flanges. The locking mounts permit the planter to be forcibly inserted over a peripheral trim strip of a wall partition, whereupon the planter is quickly, easily and stably affixed to the wall partition.

In one embodiment of the present invention, the mounting channel, including the locking mounts, extends the entire longitudinal length of the planter. In another embodiment of the present invention, while the mounting channel extends the entire longitudinal length of the planter, the locking mounts extend along the mounting channel in one or more discrete sections for a distance which is less than the entire length of the planter.

The first raised locking mount extends upwardly from the lower end of the first flange for a distance which provides space between the top of the locking mount and the bottom wall to at least accommodate the height of a peripheral trim strip of the wall partition. The second raised locking mount extends upwardly from the lower end of the second flange for a distance which is significantly less than the first locking mount.

Both locking mounts extend outwardly from each flange toward each other, gradually rising outwardly and generally perpendicularly from the lower end of each flange to form an inclined plane from the top to the bottom of each respective locking mount.

DETAILED DESCRIPTION OF THE DRAWINGS

Figure 1:
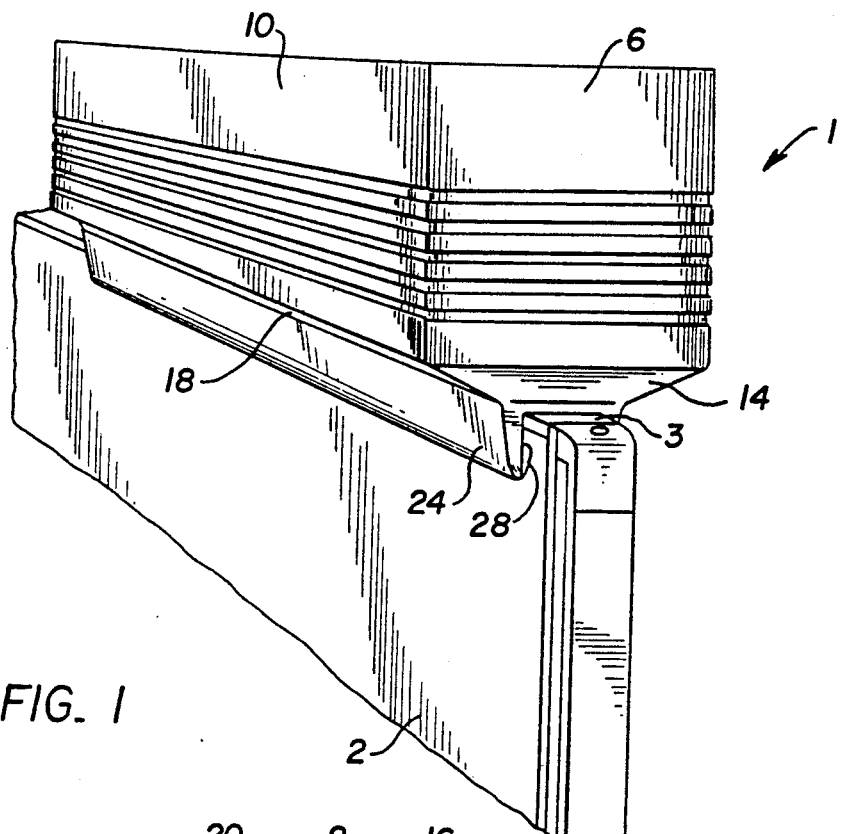
FIG. 1 is a perspective view of one embodiment of a planter in accordance with the present invention showing the planter mounted on an open plan wall partition.
Figure 2:
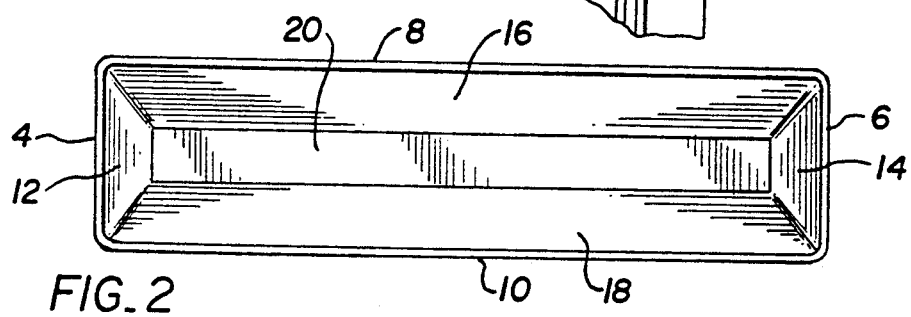
FIG. 2 is a top view of the planter shown in FIG. 1.
Figure 3:
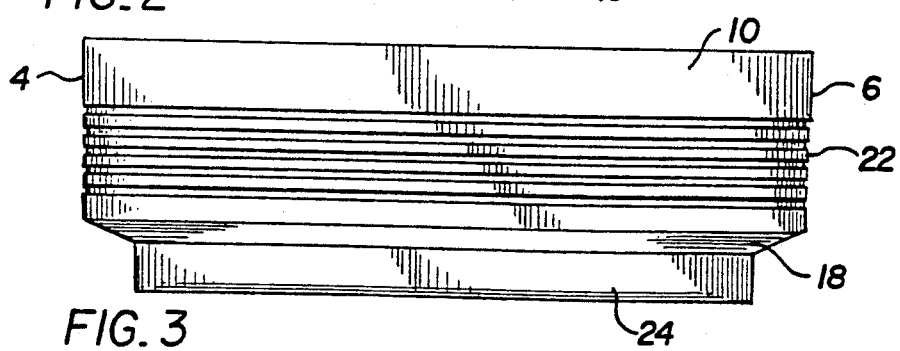
FIG. 3 is a side view of the planter shown in FIG. 1.

One embodiment of a planter in accordance with the present invention is shown in FIGS. 1-7. The planter 1, shown in FIG. 1 mounted on a wall partition 2 with a peripheral trim strip 3, includes an open-topped planter trough having a peripheral perimeter wall and a bottom wall. The peripheral perimeter wall of the planter 1 shown in FIGS. 1-7 includes a pair of symmetrical and opposed end walls 4, 6 which are connected to a pair of symmetrical and opposed side walls 8, 10. The end walls 4, 6 are each connected at a lower end to a pair of symmetrical sloped bottom end panels 12, 14, respectively. Similarly, the side walls 8, 10 are each connected at a lower end to a pair of symmetrical sloped bottom side panels 16, 18, respectively. The sloped bottom end panels 12, 14 are connected to the sloped bottom side panels 16, 18 and all of the sloped bottom panels slope downwardly and inwardly and are connected to a bottom center panel 20. While the end walls 4, 6 and the side walls 8, 10 could be connected directly to a flat bottom panel, the arrangement shown in FIGS. 1-7 was used because it is decorative, strengthens the planter 1, and ensures improved water distribution within the planter 1. Additionally, the end walls 4, 6 and the side walls 8, 10 may also include ribbing 22 on the exterior thereof for decorative purposes.

The planter 1 further includes a pair of opposed flanges which include a first flange 24 and a second flange 26 extending downwardly from the bottom center panel 20 and extending longitudinally along substantially the entire length of the planter 1. The flanges 24, 26 are spaced apart from each other to form therebetween a mounting channel for the planter 1. In one embodiment of the present invention, the flanges 24, 26 are spaced apart a distance roughly equal to, but not smaller than, the width of the peripheral trim strip 3 of the wall partition 2.

What has been described above is identical to the planter disclosed in applicant's own United States Design Patent U.S. Pat. No. Des. 312,983, issued Dec. 18, 1990. In accordance with the present invention, the planter 1 includes at least one pair of a first raised locking mount 28 and a second raised locking mount 30. The first raised locking mount 28 is positioned on the lower, inner end of the first flange 24. The second raised locking mount 30 is opposed to the first raised locking mount 28 and is positioned on the lower, inner end of the second flange 26. It is preferred that the planter 1 include two similar or identical pairs of locking mounts. Specifically, a first pair of locking mounts 28, 30 are connected to a first end of the flanges 24, 26, respectively, and a second pair of locking mounts 32, 34 are connected to a second end of the flanges 24, 26 opposite the first end, respectively.

The first locking mount 28 extends upwardly along flange 24 from the lower end of the first flange 24 any desired distance, so long as there is sufficient space between the top of the first locking mount 28 and the bottom center panel 20 to at least accommodate the height of the peripheral trim strip 3 when the planter 1 is mounted on a wall partition 2. The first locking mount 28 extends outwardly from the flange 24, gradually rising in a generally perpendicular direction from the lower end of the flange 24 towards the top of the flange 24, thereby forming an inclined plane between the bottom and the top of the first locking mount 28. The exact extent to which the first locking mount 28 extends outwardly from the flange 24 is not critical, but must be sufficient to prevent the flange 24 of the planter 1 from easily sliding over the peripheral trim strip 3 when the planter 1 is installed on a wall partition 2.

The second locking mount 30 also extends upwardly from the lower end of the second flange 26, but for a distance which is significantly less than that of the first locking mount 28. The exact distance which the second locking mount 30 extends upwardly along the second flange 26 is not critical, but it must not exceed a distance which permits sufficient clearance for the width of the peripheral trim strip 3 between the top of the second locking mount 30 and the top of the first locking mount 28 when a first side of the trim strip 3 is in contact with the top of the first locking mount 28. This distance is represented by arrows 36 and 38 in FIG. 5. In a preferred embodiment, the distance which the locking mount 30 extends upwardly along the second flange 26, is maximized. The second locking mount 30 also extends outwardly from the second flange 26, gradually rising in a generally perpendicular direction from the lower end of the second flange 26, thereby forming an inclined plane between the bottom and top of the second locking mount 30. The exact extent to which the second locking mount 30 extends outwardly from the second flange 26 is not critical, but must be sufficient to prevent the second flange 26 of the planter 1 from easily sliding over the peripheral trim strip 3 when the planter 1 is installed on a wall partition 2. The top corners 40, 42 of the locking mounts 28, 30, respectively, can be either squared or rounded but are preferably rounded because it eases the removal of the planter 1 from a wall partition 2, as discussed below.

In one specific example of the proportional relationships discussed above, the distance between the opposing inner surfaces of the first and second flanges 24, 26 is 1.848 inches at the point where the flanges 24, 26 are attached to the bottom center panel 20, widening to 2 inches at the lower ends of the flanges 24, 26. The flanges 24, 26 extend downwardly from the bottom center panel 20 a distance of 1.75 inches. The first locking mount 28 extends upwardly along the first flange 24 for a distance of 0.815 inches. The second locking mount 30 extends upwardly along the second flange 26 for a distance of 0.355 inches. The minimum distance between the opposing surfaces of the locking mounts 28, 30 is 1.567 inches, as measured at the highest point on the inclined plane of each locking mount.

Figure 8:
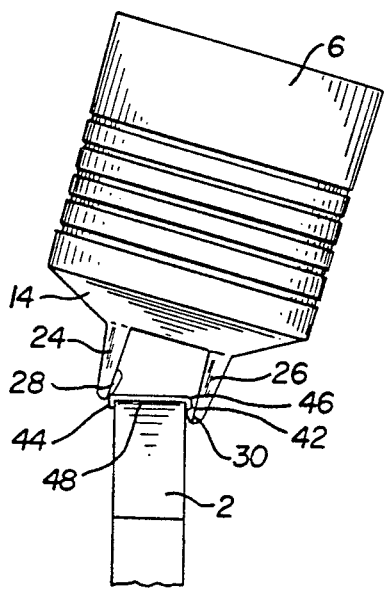
FIGS. 8-10 are a series of end views of the planter shown in FIG. 1 being installed on a wall partition.
Figure 9:
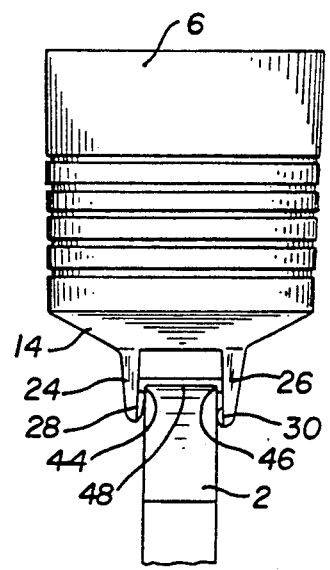
Figure 10:
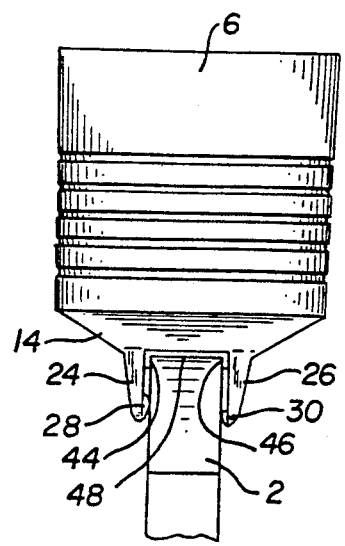

The process of attaching the planter 1 to a wall partition 2 is shown in FIGS. 8-10. The wall partition 2 includes a peripheral trim strip 3, which includes a first vertical flange 44 and an opposed second vertical flange 46 connected to and extending downwardly from a horizontal plate 48.

The planter 1 is first tilted and lowered over the trim strip 3 until the second vertical flange 46 of peripheral trim strip 3 is caught on the top corner 42 of the second locking mount 30 as shown in FIG. 8. The planter 1 is then gently rotated to bring the first locking mount 28 in contact with the trim strip 3. Because the first locking mount 28 and the second locking mount 30 are not symmetrical, when the second vertical flange 46 is inserted over the second locking mount 30 as shown in FIG. 8, a pivot point or fulcrum is created. This fulcrum operates to allow the first flange 24 to be slightly forcedly separated away from the second flange 26 as the all partition 2 and the planter 1 are rotated relative to each other. The resistance against separation is supplied by a combination of the resiliency of the materials from which the planter 1 is constructed and the distance as shown by arrow 38. The slight separation provides sufficient space for the first vertical flange 44 of the peripheral trim strip 3 to slide over the first locking mount 28, whereupon the planter 1 is mounted quickly, easily and securely, but removably, on the wall partition 2 as shown in FIGS. 8-9. As shown in FIG. 10, the planter 1 is then slid downwardly onto the wall partition 2 until the bottom panel 20 rests upon the horizontal plate 48 of the trim strip 3. The planter 1 is removed from the wall partition 2 by reversing the steps discussed above. Where the top corners 40, 42 of the first and second locking mounts 28, 30 are rounded, the first and second vertical flanges 44, 46 will slide more easily over the first and second locking mounts 28, 30, respectively.

The resiliency of the materials from which planter 1 is constructed functions to continuously urge flanges 24, 26 toward each other, thereby pressing locking mounts 28, 30 toward each other, which, in turn, function to securely hold the planter 1 on the wall partition 2. Additionally, in the event of jarring, bumping or shaking, the planter 1 will remain affixed to the wall partition 2 because the raised locking mounts 28, 30 cannot easily pass over the peripheral trim strip 3, as shown in FIG. 10.

In order to explain the configuration of my planter, I have shown the planter in FIGS. 1-10, by way of example, as a trough or box-like structure. However, it is to be understood that my invention resides in the improved mechanism for attaching a planter to an open plan wall partition having a peripheral trim strip and that the planter itself can have virtually any shape, box-like, round, octagonal, etc., without departing from the scope of my invention.

While the planter can be made of any suitable material, plastic is the preferred material because it is inexpensive and long lasting, requiring very little maintenance. Furthermore, plastic materials are impervious to water damage which would otherwise be associated with wood or metal, unless the wood or metal were appropriately treated to withstand the effects of water. Also, plastic materials are easily extruded or formed in the desired shape. In a preferred embodiment, the planter 1 is comprised of a plastic material and the end walls 4, 6, the side walls 8, 10, the sloped bottom end panels 12, 14, the sloped bottom side panels 16, 18, the bottom center panel 20, the flanges 24, 26 and the locking mounts 28, 30 are all continuously cast as one integral piece.

Figure 4:
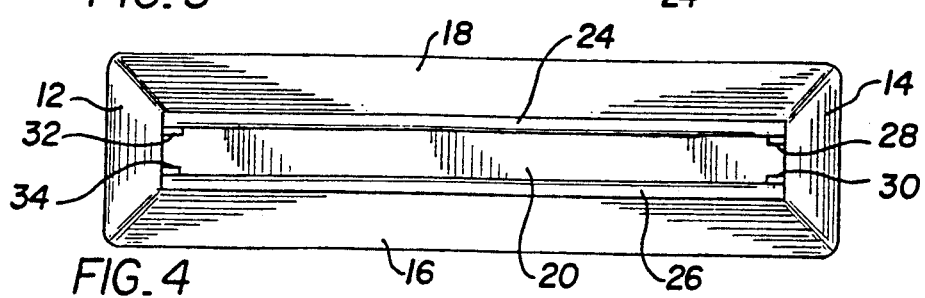
FIG. 4 is a bottom view of the planter shown in FIG. 1.
Figure 5:
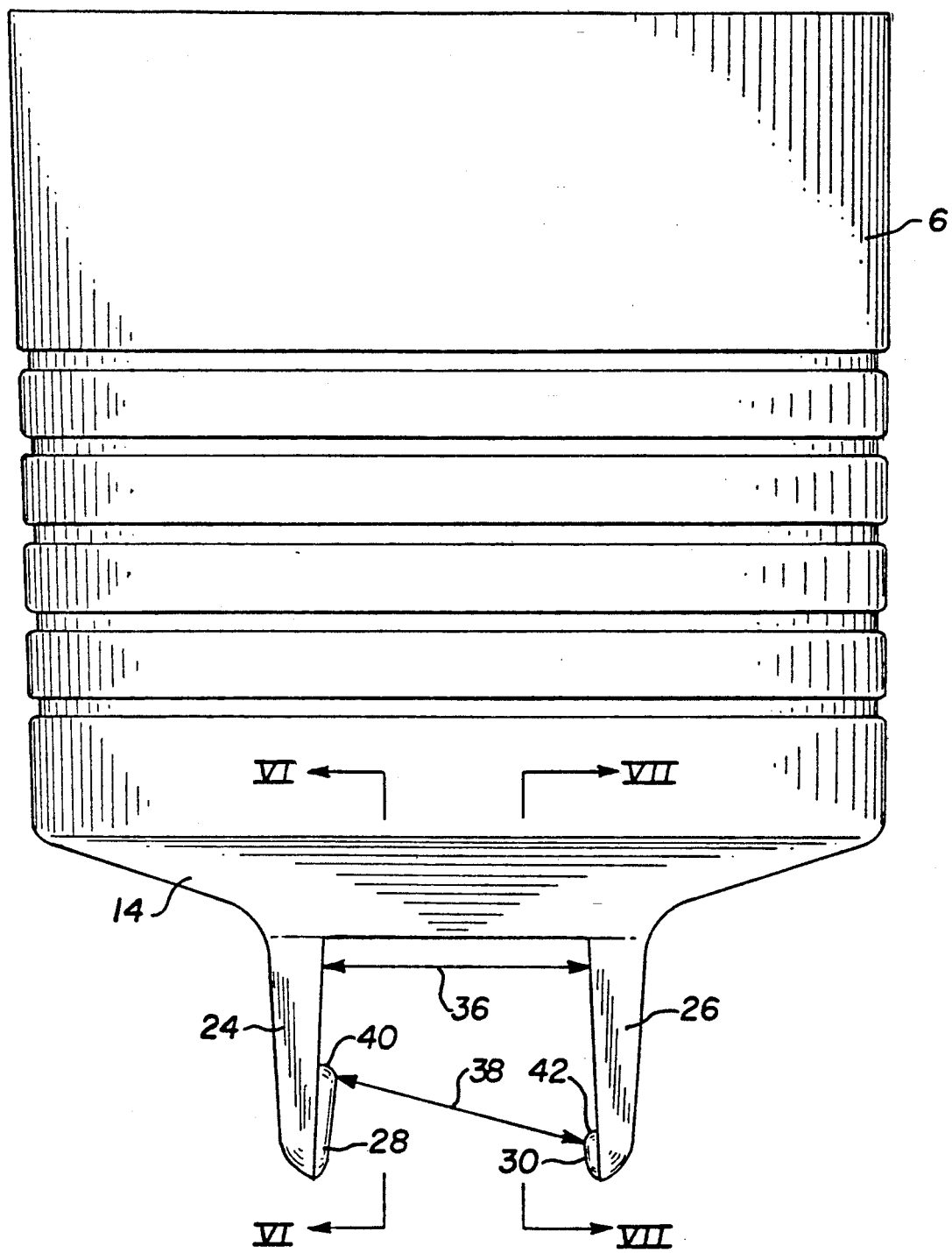
FIG. 5 is an end view of the planter shown in FIG. 1.
Figure 6:
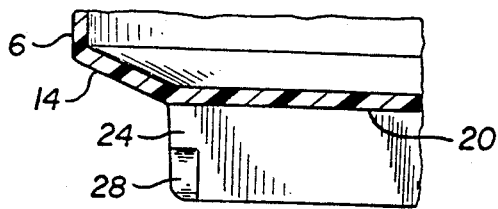
FIG. 6 is a section taken along lines VI—VI in FIG. 5.
Figure 7:
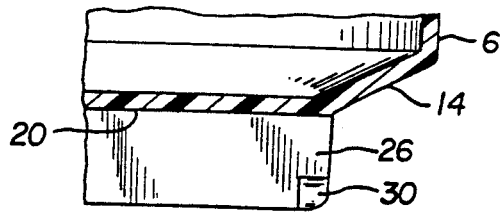
FIG. 7 is a section taken along lines VII—VII in FIG. 5.

Although the flanges 24, 26 are shown as extending longitudinally along substantially the entire length of the planter 1 in FIG. 4, more specifically, the entire length of bottom center panel 20, it is to be understood that other arrangements are possible. One or more pairs of flanges 24, 26 could extend either longitudinally or traversely along either the entire length of the planter 1 or along a portion of the length of the planter 1. The flanges 24, 26 could also extend in one or more discrete sections along the planter 1. Further still, the locking mounts 28, 30 could likewise extend along either the entire length of the flanges 24, 26 or only over one or more sections of the flanges 24, 26.

Having described the presently preferred embodiments of my invention, it is to be understood that it may otherwise be embodied within the scope of the appended claims.

I claim:

1. A planter adapted to be mounted upon a wall partition including a peripheral trim strip, said planter comprising:
    a. an open topped planter trough having a peripheral perimeter wall and a bottom wall attached thereto;
    b. a pair of opposed flanges extending downwardly from said bottom wall and spaced apart from each other to form therebetween a mounting channel for said planter;
    c. a first raised locking mount on a lower, inner end of a first of said flanges, said first locking mount extending upwardly from said lower end of said first flange for a distance which provides space between a top of said first locking mount and said bottom wall to at least accommodate the height of a peripheral trim strip of said wall partition, said first locking mount extending outwardly from said first flange and gradually rising generally perpendicularly from said first flange to form an inclined plane between a bottom of said first locking mount and said top of said first locking mount; and
    d. a second raised locking mount opposed to said first locking mount and positioned on a lower inner end of a second of said flanges, said second locking mount extending upwardly from said lower end of said second flange a distance significantly less than said distance of said first locking mount, said second locking mount extending outwardly from said second flange gradually rising generally perpendicularly from said lower end of said second flange to form an inclined plane between a bottom of second locking mount and said top of said second locking mount.

2. The planter of claim 1 wherein said mounting channel is integrally formed as part of said bottom wall.

3. The planter of claim 1 wherein said planter trough is generally rectangular and includes a pair of symmetrical and opposed end walls, a pair of symmetrical and opposed side walls connected to said end walls, and a bottom wall connected to a lower end of each of said end walls and said side walls.

4. The planter of claim 1 wherein said mounting channel extends longitudinally along the length of said planter.

5. The planter of claim 4 wherein said locking mounts extend along said mounting channel in one or more discrete sections for a distance which is less than the entire length of said mounting channel.

6. The planter of claim 5 wherein said flanges each include a first pair of said first and said second locking mounts at a first end of said mounting channel and a second pair of said first and said second locking mounts at a second end of said mounting channel opposite said first end of said mounting channel.

7. A planter adapted to be mounted upon a wall partition comprising:
    a. an open topped planter trough having a peripheral perimeter wall and a bottom wall attached thereto;
    b. a pair of opposed flanges extending downwardly from said bottom wall and spaced apart from each other to form therebetween a mounting channel for said planter, said mounting channel extending longitudinally along the length of said planter;
    c. a first raised locking mount on a lower, inner end of a first of said flanges; and
    d. a second raised locking mount opposed to said first locking mount and positioned on a lower, inner end of a second of said flanges, said locking mounts extending along said mounting channel in one or more discrete sections for a distance which is less than the entire length of said mounting channel.

8. The planter of claim 7 wherein said mounting channel is integrally formed as part of said bottom wall.

9. The planter of claim 7 wherein said planter trough is generally rectangular and includes a pair of symmetrical and opposed end walls, a pair of symmetrical and opposed side walls connected to said end walls, and a bottom wall connected to a lower end of each of said end walls and said side walls.

10. The planter of claim 7 wherein said flanges each include a first pair of said first and said second locking mounts at a first end of said mounting channel and a second pair of said first and said second locking mounts at a second end of said mounting channel opposite said first end of said mounting channel.

11. The planter of claim 7 wherein said first locking mount extends upwardly from said lower end of said first flange for a distance which provides space between a top of said first locking mount and said bottom wall to at least accommodate the height of a peripheral trim strip of said wall partition.

12. The planter of claim 11 wherein said first locking mount extends outwardly from said first flange and gradually rises generally perpendicularly from said first flange to form an inclined plane between a bottom of said first locking mount and said top of said first locking mount.

13. The planter of claim 12 wherein said second locking mount extends upwardly from said lower end of said second flange a distance significantly less than said distance of said first locking mount not exceeding a distance which permits sufficient clearance for the width of a peripheral trim strip of said wall partition when said peripheral trim strip is inserted between a top of said second locking mount and a top of said first locking mount.

14. The planter of claim 13 wherein said second locking mount extends outwardly from said second flange gradually rising generally perpendicularly from said lower end of said second flange to form an inclined plane between a bottom of said second locking mount and said top of said second locking mount.

15. A planter adapted to be mounted upon a wall partition comprising:
    a. an open topped planter trough having a peripheral perimeter wall and a bottom wall attached thereto;
    b. a pair of opposed flanges extending downwardly from said bottom wall and spaced apart from each other to form therebetween a mounting channel for said planter;
    c. a first raised locking mount on a lower, inner end of a first of said flanges, wherein said first locking mount extends upwardly from said lower end of said first flange for a distance which provides space between a top of said first locking mount and said bottom wall to at least accommodate the height of a peripheral trim strip of said wall partition and said first locking mount extends outwardly from said first flange and gradually rises generally perpendicularly from said first flange to form an inclined plane between a bottom of said first locking mount and said top of said first locking mount; and
    d. a second raised locking mount opposed to said first locking mount and positioned on a lower, inner end of a second of said flanges, wherein said second locking mount extends upwardly from said lower end of said second flange a distance significantly less than said distance of said first locking mount not exceeding a distance which permits sufficient clearance for the width of a peripheral trim strip of said wall partition when said peripheral trim strip is inserted between a top of said second locking mount and a top of said first locking mount.

16. The planter of claim 15 wherein said planter trough is generally rectangular and includes a pair of symmetrical and opposed end walls, a pair of symmetrical and opposed side walls connected to said end walls, and a bottom wall connected to a lower end of each of said end walls and said side walls.

17. The planter of claim 15 wherein said mounting channel extends longitudinally along the length of said planter.

18. The planter of claim 17 wherein said locking mounts extend along said mounting channel in one or more discrete sections for a distance which is less than the entire length of said mounting channel.

19. The planter of claim 18 wherein said flanges each include a first pair of said first and said second locking mounts at a first end of said mounting channel and a second pair of said first and said second locking mounts at a second end of said mounting channel opposite said first end of said mounting channel.

20. The planter of claim 15 wherein said second locking mount extends outwardly from said second flange gradually rising generally perpendicularly from said lower end of said second flange to form an inclined plane between a bottom of said second locking mount and said top of said second locking mount.

* * * * *